(12) United States Patent
Sawayanagi

(10) Patent No.: US 6,383,001 B2
(45) Date of Patent: May 7, 2002

(54) MODULAR CONNECTOR FITTING STRUCTURE

(75) Inventor: Masahiro Sawayanagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/742,097

(22) Filed: Dec. 22, 2000

(30) Foreign Application Priority Data

Dec. 24, 1999 (JP) .............................................. 11-367316

(51) Int. Cl.$^7$ ................................................. H01R 13/64
(52) U.S. Cl. ........................ 439/248; 439/249; 439/34
(58) Field of Search ................. 439/247, 248, 439/249

(56) References Cited

FOREIGN PATENT DOCUMENTS

| JP | 63-72115 | 5/1988 |
|---|---|---|
| JP | 7-47839 | 2/1995 |
| JP | 11-78521 | 3/1999 |
| JP | 11-507309 | 6/1999 |

OTHER PUBLICATIONS

Patent Abstract of Japan 07–047839, Feb. 21, 1995.
Patent Abstract of Japan 11–078521, Mar. 23, 1999.

*Primary Examiner*—Renee Luebke
*Assistant Examiner*—Briggitte R. Hammond
(74) *Attorney, Agent, or Firm*—Sughrue Mion, PLLC

(57) ABSTRACT

Electric wire holders 8a, 8b extending in a fitting direction Z are integrally provided on an electric wire insertion tube 5 of a bracket 2. Locking hooks 15a, 15b are arranged in spatial regions S1, S2 which are surrounded by outer peripheral walls of the electric wire holders 8a, 8b and the electric wire insertion tube 5 and by tangent lines C1, C2 connecting ridges 9a, 9b of the electric wire holders 8a, 8b and the outer peripheral wall of the electric wire insertion tube 5.

2 Claims, 8 Drawing Sheets

MODULAR CONNECTOR FITTING STRUCTURE

BACKGROUND OF THE INVENTION

The present invention relates to a fitting structure for fitting a modular connector to a vehicle body panel for the purpose of supplying electric power to vehicle interior equipment such as sun visors, vehicle room lamps, and so on when they are mounted on a roof trim to be integral therewith.

The vehicle sun visor has originally been a sun shading plate which is mounted inside the vehicle in order to cut off sunlight. However, due to recent increase of women drivers, there have appeared some sun visors which are provided with mirrors and lamps on sun visor bodies.

In such a sun visor, a power supply electric wire is connected to a connector which is provided on a shaft for supporting the sun visor for conduction of electricity from a power source to the lamps.

FIGS. 8A to 8C are sectional views showing respective steps of fitting such connector to the vehicle body panel covered with the roof trim.

A connector 30 consists of a bracket 32 provided with an electric wire insertion tube 35, a connection electric wire 40a guided out from the electric wire insertion tube 35, and a joint connector (female type) 41a attached to the electric wire 40a.

On the other hand, a power supply electric wire 40b held between an inner panel 37 covered with a roof trim 36 and an outer wall panel 38 of the vehicle body is guided out through a fitting hole 37a formed in the inner panel 37, and a joint connector (male type) 41b is attached to an end of the electric wire 40b (FIG. 8A).

In the next step, the joint connector 41a and the joint connector 41b are engaged, and the engaged joint connectors 41a, 41b are inserted into a space between the inner panel 37 and the outer wall panel 38. Then, the bracket 32 is fitted to the fitting hole 37a in the inner panel 37 (FIG. 8B).

Thereafter, the bracket 32 is fixed to the inner panel 37 by means of screws or the like. The joint connectors 41a, 41b are positioned at an approximately middle part between the inner panel 37 and the outer wall panel 38 and brought into a mechanically and electrically stabilized state (FIG. 8C).

However, in fitting the above described connector 30 to the inner panel 37, the joint connector (male type) 41b on the vehicle side is once drawn out through the fitting hole 37a in the inner panel 37 to make a connection between the joint connectors 41a, 41b. For this reason, each of the electric wires 40a and 40b is provided with an excess length in addition to a determined length.

Accordingly, there has been probability that the joint connectors 41a, 41b may be damaged by getting caught between the inner panel 37 and the outer wall panel 38, or the electric wires 40a, 40b may be bitten between the inner panel 37 or the outer wall panel 38 and the joint connectors 41a, 41b.

SUMMARY OF THE INVENTION

The invention has been made in view of the above described circumstances, and it is an object of the invention to provide a fitting structure for a modular connector in which a catch of the joint connectors and a bite of the electric wires will be prevented, and workability of fitting the modular connector can be improved.

In order to achieve the above object, according to the present invention, there is provided a modular connector for attaching an interior equipment of a vehicle onto an interior wall member covering an inner face of a vehicle body panel and for supplying electric power to the interior equipment, comprising:

a connector member attached onto the interior wall member, and provided with a through hole and a first electric wire for supplying the electric power to the interior equipment;

a bracket member provided with the interior equipment and a tube-shaped body through which a second electric wire is led out from the interior equipment, the tube-shaped body being inserted into the through hole to engaged with the connector member to electrically connect the first and second electric wires;

a wire holder protruded from an outer peripheral face of the tube-shaped body and extending in an axial direction of the tube-shaped body, for holding the second electric wire;

a first engagement member arranged in a portion defined as a spatial region surrounded by the wire holder, the outer peripheral face of the tube-shaped body, and a tangent line connecting a ridge portion of the wire holder and the outer peripheral face of the tube-shaped body; and a second engagement member provided in a circumferential portion of the through hole of the connector member, for being engaged with the first engaging member to retain the bracket member onto the connector member.

In this configuration, since the first engaging member is arranged in a portion defined as a spatial region surrounded by the wire holder, the outer peripheral face of the tube-shaped body, and a tangent line connecting a ridge portion of the wire holder and the outer peripheral face of the tube-shaped body, when the connector member is inserted into the through hole of the connector member, the first engaging member will not interfere with the through hole, and the insertion can be smoothly performed.

Therefore, the fitting work can be smoothly performed to enhance efficiency of the work, and damages of the first engagement member and other members will be prevented.

In this configuration, since the electric wire drawn out from the tube-shaped body is trimmed through the wire holder, and there is no need of excess length of the electric wires, the catch of the joint connectors between the vehicle body panel and the outer wall panel of the vehicle, and the bite of the electric wires attributed to the presence of the excess length of the electric wires will be prevented.

Moreover, since the wire holder is in such a form as extending in the fitting direction of the bracket member, the wire holder acts as a fitting guide when the bracket is inserted into the through hole of the connector member, whereby the bracket member can be smoothly inserted into the connector member.

Further, since the wire holder is provided on the tube-shaped portion, unstable movement of the excess portion of the electric wire will be eliminated.

Preferably, a slit from which the second electric wire is inserted is formed in the ridge portion of the wire holder.

In this configuration, the electric wire is smoothly introduced into the wire holder, and the workability of inserting the electric wire can be enhanced.

DETAILED DESCRIPTION OF THE PREFERRED EMBODIMENTS

Now, a modular connector fitting structure according to the invention will be described in detail by way of examples referring to the accompanying drawings.

Figure 1:
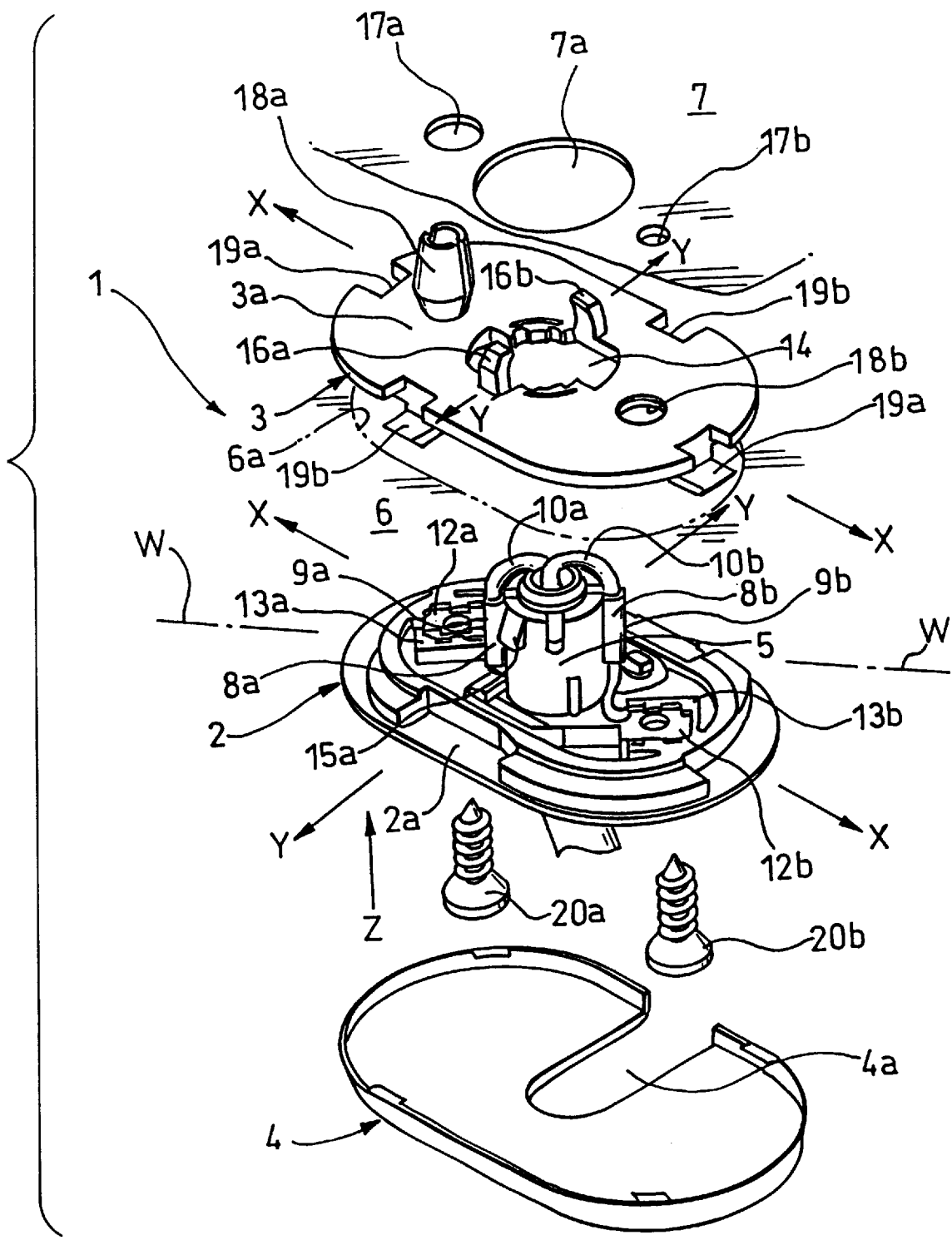
FIG. 1 is an exploded perspective view showing a modular connector fitting structure according to one embodiment of the invention.

As shown in FIG. 1, a modular connector 1 in this embodiment comprises, as main components, a bracket 2, a connector 3 on which the bracket 2 is adapted to be mounted, and a cover 4 adapted to cover a vehicle room side of the bracket 2.

The bracket 2 consists of a bracket body 2a in an oval shape made of synthetic resin, and an electric wire insertion tube 5 in a cylindrical shape which is provided at a central part of the bracket body 2a so as to project therefrom.

The electric wire insertion tube 5 extends in a fitting direction Z in which the modular connector 1 is fitted to an inner body panel 7 covered with a roof trim 6. On an outer peripheral wall of the electric wire insertion tube 5, are integrally provided electric wire holders 8a, 8b in a shape of a prism along a substantially diagonal line W of the bracket body 2a.

Figure 2:
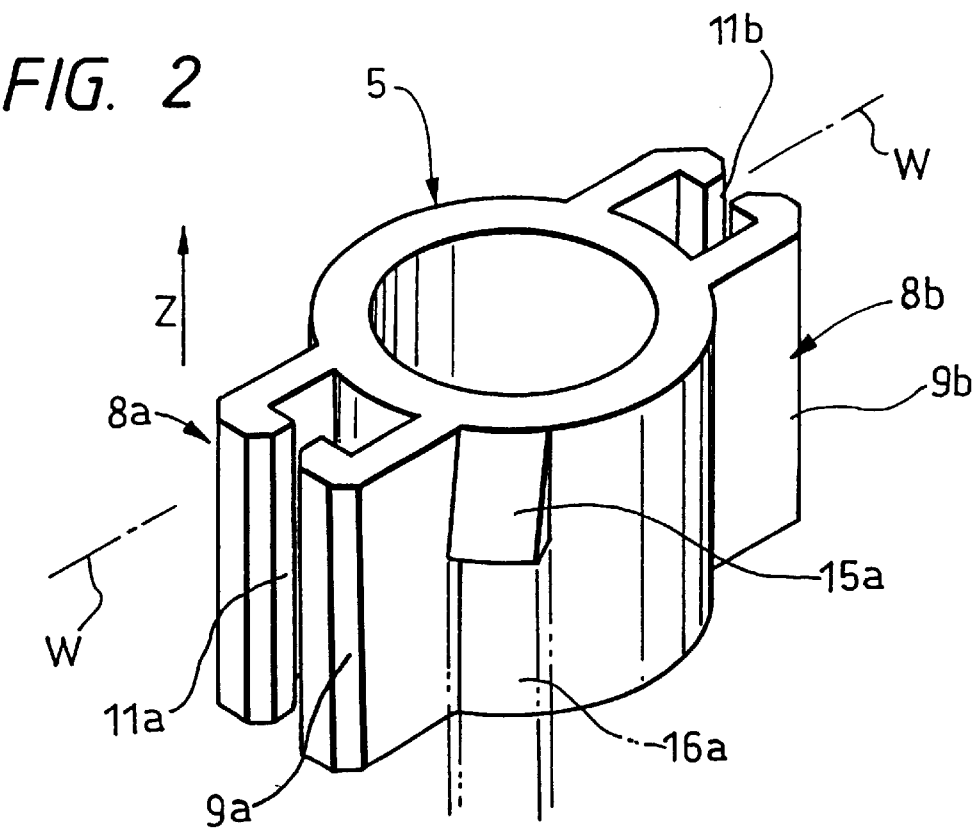
FIG. 2 is an enlarged perspective view of an essential part of a bracket in FIG. 1.
Figure 3:
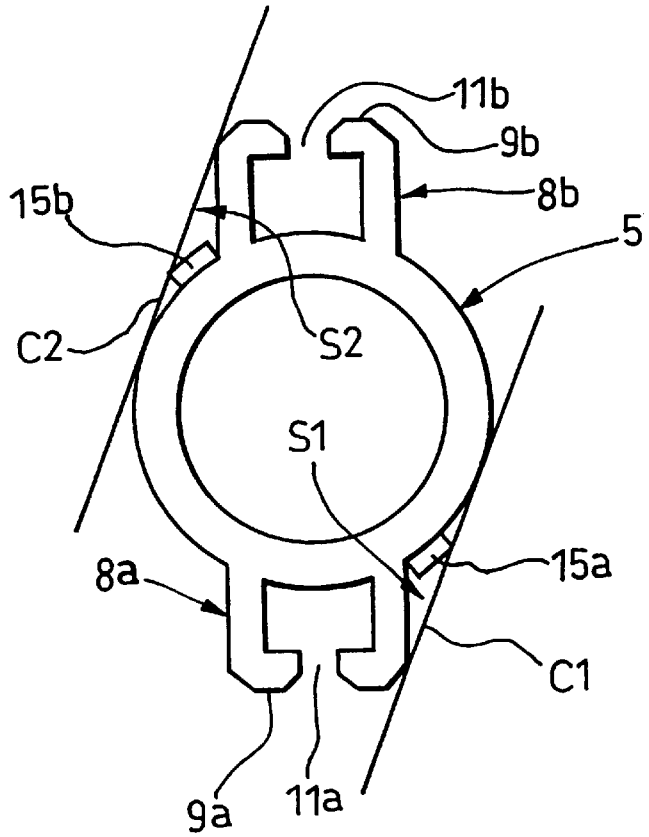
FIG. 3 is a plan view of FIG. 2.

Respective ridges 9a, 9b of the electric wire holders 8a, 8b are provided with slits 11a, 11b through which electric wires 10a, 10b are inserted in the fitting direction Z, as shown in FIGS. 2 and 3.

There are also provided on the outer peripheral wall of the electric wire insertion tube 5, locking hooks 15a, 15b in a triangular shape in cross section in a shorter diameter direction Y of the bracket body 2a, integrally with (or adjacent to) the electric wire holders 8a, 8b. The locking hooks 15a, 15b are adapted to engage with locking arms 16a, 16b on the connector 3 and serve as stoppers, when the bracket 2 is mounted on the connector 3.

These locking hooks 15a, 15b are arranged in spatial regions S1, S2 which are surrounded by the outer peripheral walls of the electric wire holders 8a, 8b and the electric wire insertion tube 5 and by tangent lines C1, C2 connecting the ridges 9a, 9b of the electric wire holders 8a, 8b and the outer peripheral wall of the electric wire insertion tube 5.

On the other hand, the connector 3 includes a connector body 3a in an oval shape made of synthetic resin or the like, and a tube insertion hole 14 in a contorted circular shape which is formed at a central part of the connector body 3a.

Around the tube insertion hole 14, the locking arms 16a, 16b which are in a form of elastically projecting pieces and positioned so as to be engaged with the locking hooks 15a, 15b are integrally provided on both ends in a shorter diameter direction Y of the connector body 3a.

Because upper faces of the locking hooks 15a, 15b are slanted, the locking arms 16a, 16b temporarily ride on the locking hooks 15a, 15b and are elastically deformed when the electric wire insertion tube 5 is inserted and pushed into the tube insertion hole 14, and thereafter, the locking arms 16a, 16b are restored to the original shape to be engaged with the locking hooks 15a, 15b.

The bracket body 2a having the electric wire insertion tube 5 is provided with recesses 13a, 13b in which terminals 12a, 12b are received, on both sides in a longitudinal direction X of the bracket body 2a.

In the recesses 13a, 13b, are received the terminals 12a, 12b which are connected to ends of the electric wires 10a, 10b extending from the electric wire insertion tube 5 to the electric wire holders 8a, 8b.

In other words, the terminals 12a, 12b connected to the ends of the electric wires 10a, 10b which are guided out from the electric wire holders 8a, 8b are mounted on a surface of the bracket body 2a on both sides interposing the electric wire insertion tube 5.

Also on both ends in a longer diameter direction X of the connector body 3a, is formed a projected locking portion 18a which is adapted to be engaged in the locking portion fitting hole 17a formed in the inner body panel 7, and a screw insertion hole 18b which is coaxial with a screw fitting hole 17b formed in the inner body panel 7.

Although not shown in the drawings, on a back face of the connector 3 at a position where the locking portion 18a is formed, there is provided a recess in which a terminal connected to the power supply electric wire on a side of a joint connector is received.

Additionally, on both ends of the longer diameter direction X and the shorter diameter direction Y of the connector body 3a, are respectively provided locking pieces 19a, 19b, 19c and 19d in a substantially L-shape for locking the roof trim 6.

Then, the modular connector 1 in which the bracket 2 has been mounted on the connector 3 by inserting the electric wire insertion tube 5 of the bracket 2 into the tube insertion hole 14 of the connector 3 fitted to the roof trim 6 is attached to the inner body panel 7. Thus, the modular connector 1 is fitted to the inner body panel 7 by tightening screws 20a, 20b. Thereafter, the decorative cover 4 having a cut-out 4a through which a visor mounting shaft is passed is attached to the vehicle room side of the bracket 2.

FIGS. 4 to 7 are sectional views showing respective steps of attaching the modular connector 1 to the inner body panel 7.

First, the connection electric wires 10a, 10b connected to the sun visor or so are guided out from the electric wire insertion tube 5 of the bracket 2, and the terminals 12a, 12b fitted to the ends of the electric wires 10a, 10b are respectively received in the recesses 13a, 13b.

Figure 4:
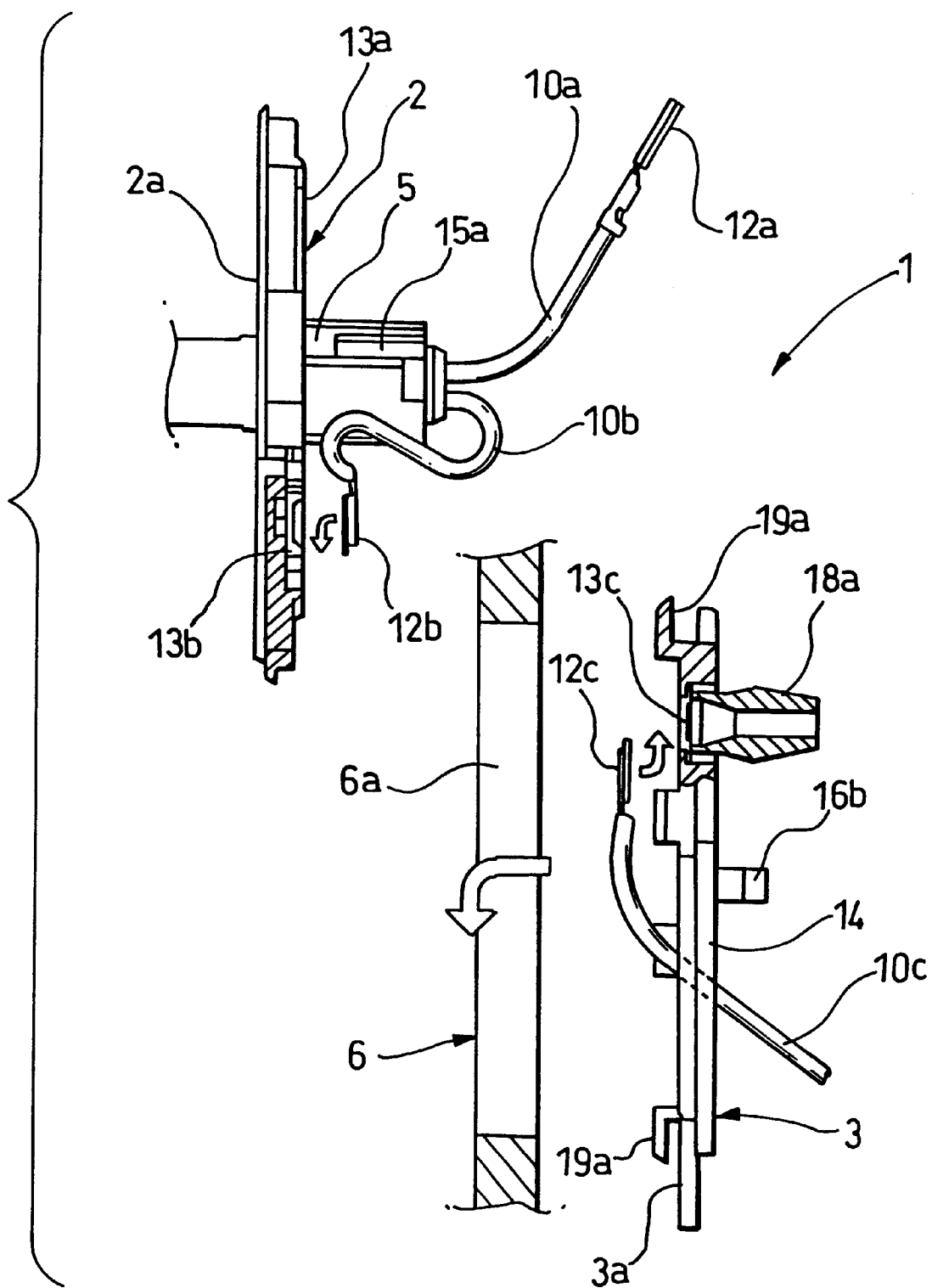
FIG. 4 is an exploded sectional view showing the modular connector fitting structure in a state before a mount of the modular connector.

In the meantime, a terminal 12c attached to an end of a power supply electric wire 10c on the joint connector side guided out from the vehicle is passed through the tube insertion hole 14 in the connector 3 and received in a recess 13c formed in a back face of the connector 3 at a position where the locking portion 18a is provided (see FIG. 4).

Figure 5:
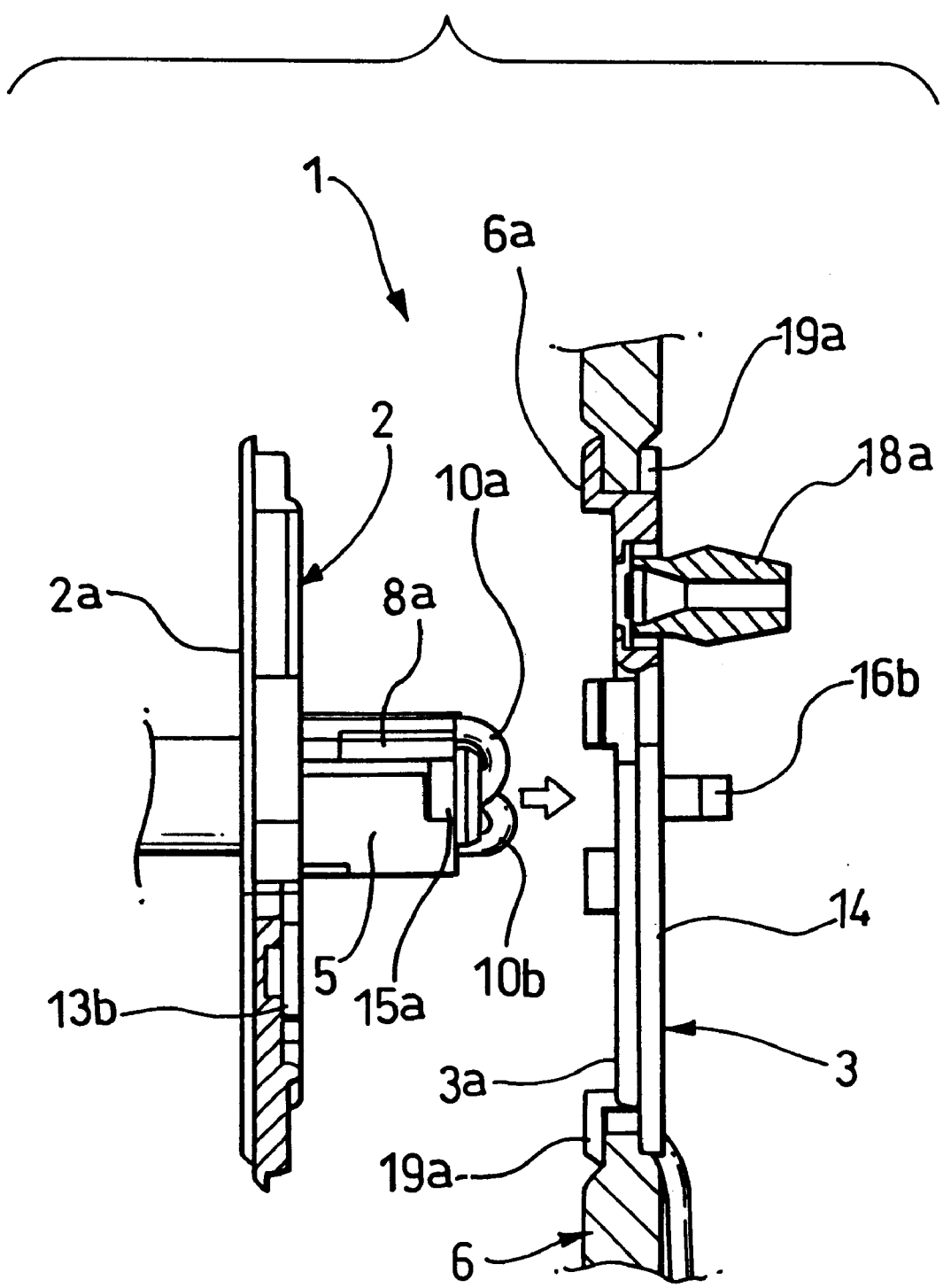
FIG. 5 is a sectional view showing a state wherein a connector has been attached to a roof trim.
Figure 6:
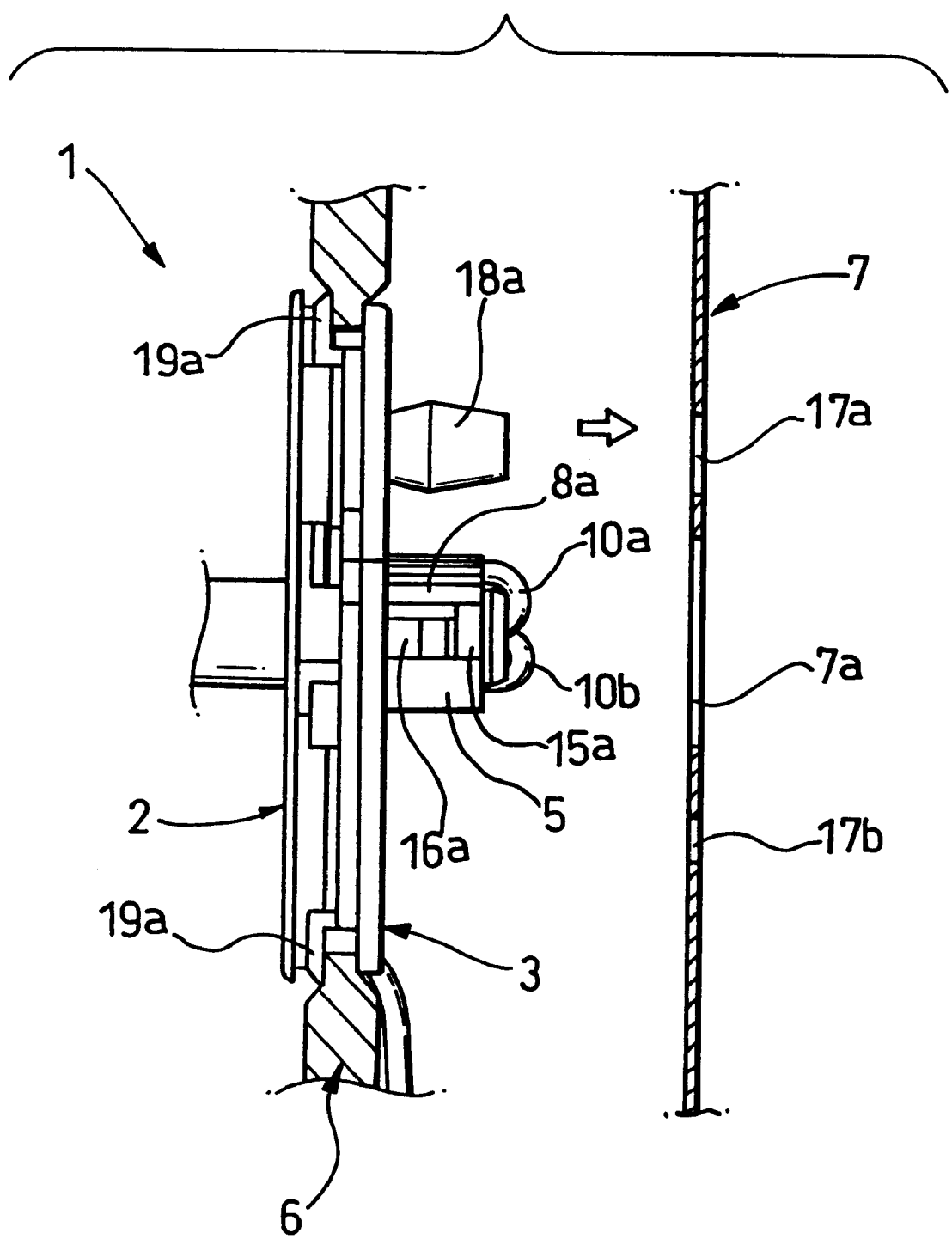
FIG. 6 is a sectional view showing a state wherein the bracket has been mounted on the connector.
Figure 7:
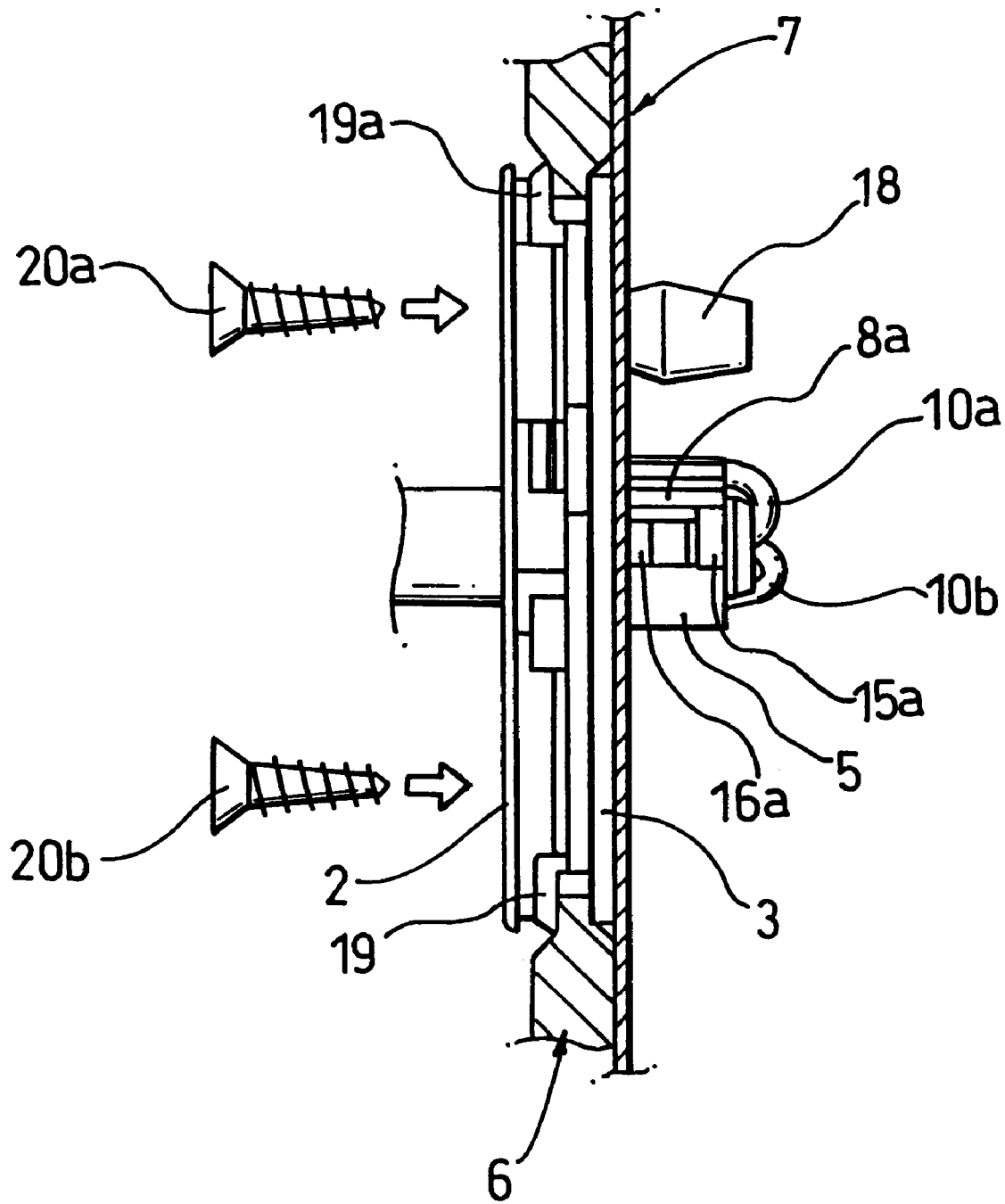
FIG. 7 is a sectional view showing a state wherein the modular connector has been attached to a vehicle body panel.
Figure 8A:
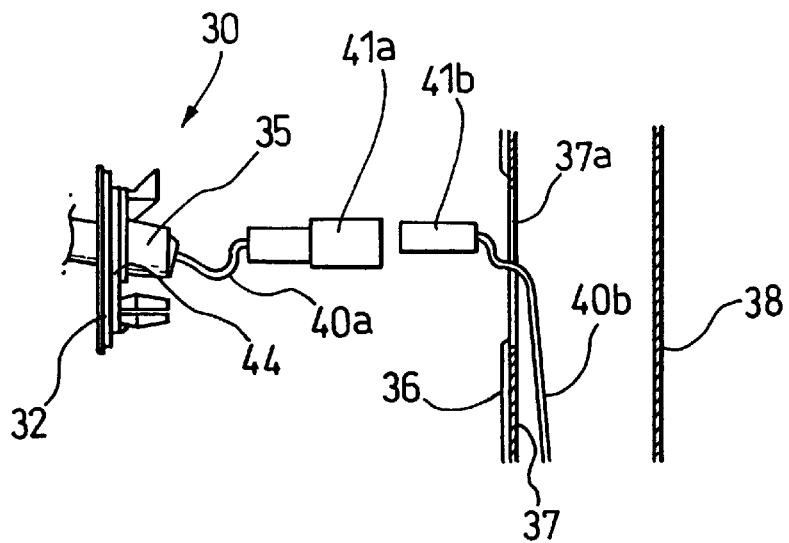
FIGS. 8A, 8B and 8C are sectional views of respective steps of fitting a related modular connector.
Figure 8B:
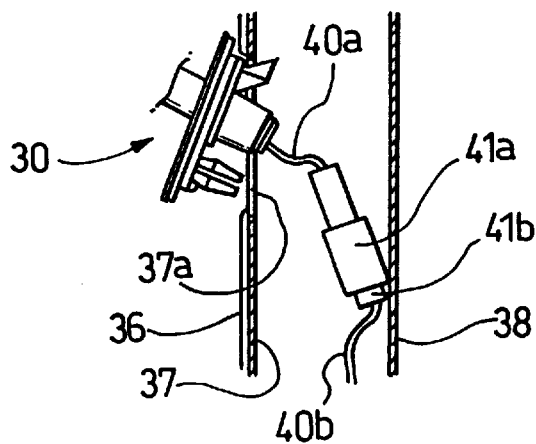
Figure 8C:
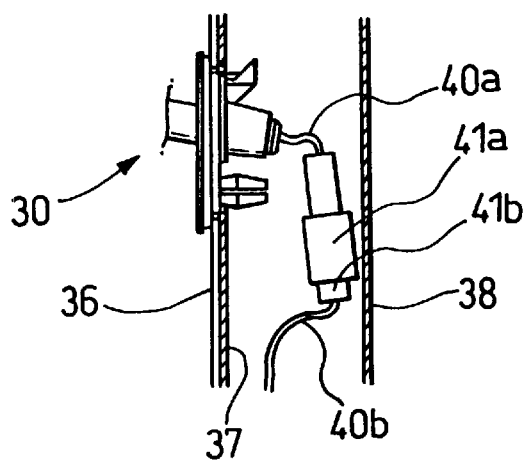
Figure 9:
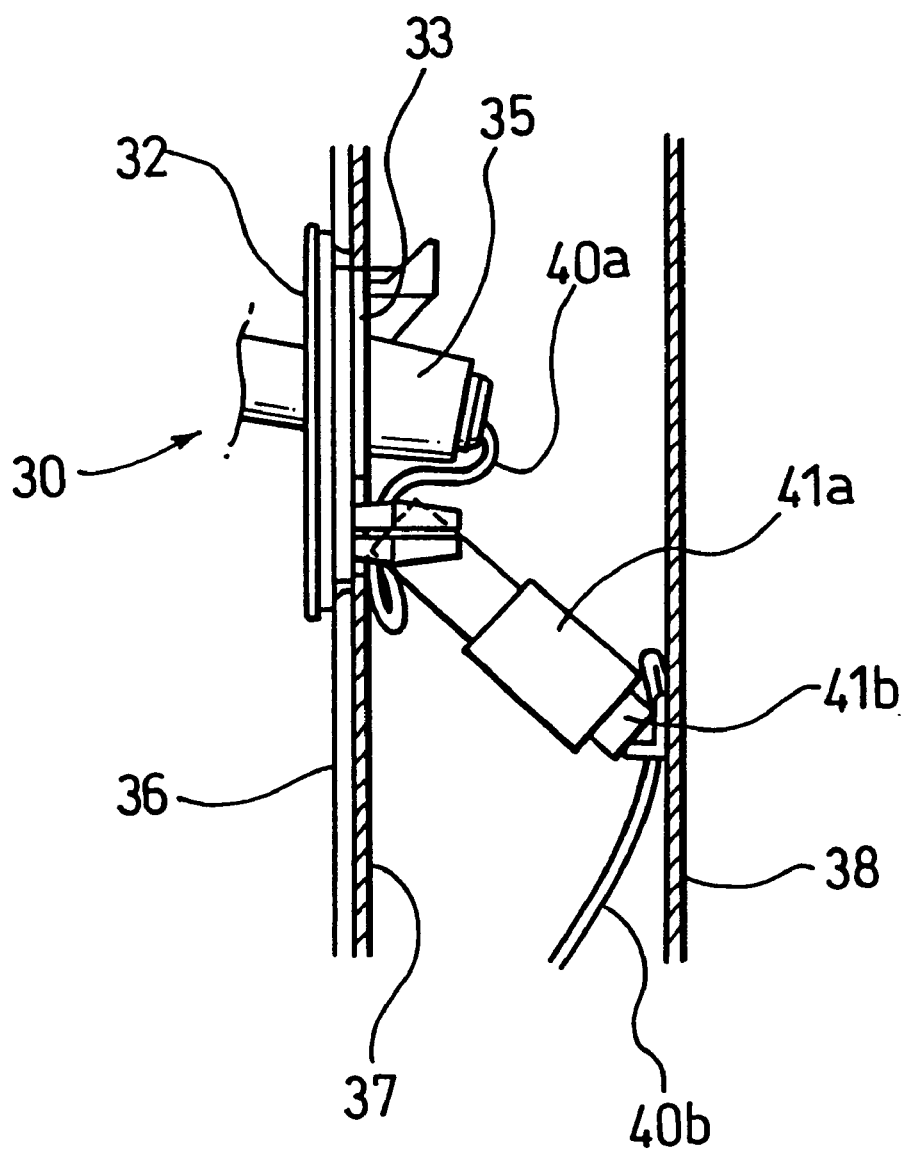
FIG. 9 is a sectional view showing an unfavorable state of the related connector attached to the vehicle body panel.

Then, the connector 3 is inserted in the fitting hole 6a in the roof trim 6, locked by means of the locking pieces 19a, 19b formed at the outer circumference of the connector 3, and thus, mounted on the roof trim 6 (see FIG. 5).

Then, the bracket 2 is mounted on the connector 3 by inserting the electric wire insertion tube 5 of the bracket 2 into the tube insertion hole 14 of the connector 3. On this occasion, the locking arms 16a, 16b provided on the connector 3 temporarily ride on the locking hooks 15a, 15b provided on the bracket 2 and are engaged with the locking hooks 15a, 15b thereafter. Thus, the bracket 2 can be reliably mounted on the connector 3 (see FIG. 6).

Then, the electric wire insertion tube 5 of the modular connector 1, that is, the electric wire insertion tube 5 of the bracket 2 is inserted into a fitting hole 7a in the inner body panel 7, and at the same time, the locking portion 18a of the connector 3 is fitted and locked in a fitting hole 17a in the inner body panel 7. Then, the modular connector 1 is fixed to the inner body panel 7 by tightening the screws 20a, 20b.

The connection electric wire 10a and the power supply electric wire 10c are electrically connected through these tightening screws 20a, 20b, while the connection electric wire 10b is connected to the ground thereby bringing a lamp provided on the sun visor into electrical conduction. Thereafter, the cover 4 is attached to the bracket 2 on the vehicle room side.

In the modular connector fitting structure in this embodiment, since the electric wire-holders 8a, 8b are provided on the electric wire insertion tube 5 of the bracket 2, the electric wires 10a, 10b drawn out from the electric wire insertion tube 5 are guided out through the electric wire holders 8a, 8b to have a determined length. Accordingly, an excess length of the wires is not required.

Therefore, when the modular connector 1 is attached to the inner body panel 7, a catch of the joint connectors between the inner body panel 7 and the outer wall panel of the vehicle, and a bite of the electric wires 10a, 10b will be prevented, and thus, damages of the joint connectors as well as breaks of the electric wires will be eliminated.

Moreover, since the electric wire holders 8a, 8b are in such a form as extending in the fitting direction Z, the electric wire holders 8a, 8b act as fitting guides when the bracket 2 is mounted on the connector 3, whereby the bracket 2 can be smoothly inserted into the connector 3.

Additionally, the locking hooks 15a, 15b are arranged in the spatial regions S1, S2 which are surrounded by the outer peripheral walls of the electric wire holders 8a, 8b and the electric wire insertion tube 5 and by the tangent lines C1, C2 connecting the ridges 9a, 9b of the electric wire holders 8a, 8b and the outer peripheral wall of the electric wire insertion tube 5. Therefore, when the bracket 2 is mounted on the connector 3, the locking hooks 15a, 15b will not interfere with the tube insertion hole 14 of the connector 3 and the insertion can be smoothly performed.

Therefore, the fitting work can be smoothly performed resulting in enhancement of the workability, and damages of the locking hooks 15a, 15b, and so on will be prevented.

Further, by providing the electric wire holders 8a, 8b on the electric wire insertion tube 5, unstable movements of the excess portions of the electric wires 10a, 10b, 10c will be eliminated, and the terminals 12a, 12b, 12c fitted to the ends of the electric wires 10a, 10b, 10c will be prevented from being pulled off from the recesses 13a, 13b, 13c which are provided at determined positions. The work can be thus facilitated.

In this modular connector 1, there are provided the electric wire, insertion slits 11a, 11b on the ridges 9a, 9b of the electric wire holders 8a, 8b in the fitting direction Z. Accordingly, the electric wires 10a, 10b are inserted by way of the electric wire insertion slits 11a, 11b when they are received in the electric wire holders 8a, 8b, and the electric wires 10a, 10b are smoothly introduced into the electric wire holders 8a, 8b. Thus, the workability of inserting the electric wires can be improved.

One of the embodiments according to the invention has been described above. However, the invention is not limited to the above described embodiment, but appropriate modifications and improvements can be made.

For example, although the electric wire insertion tube is in a cylindrical shape in the described embodiment, it may be in a prism shape or some other shapes, and the electric wire holder may be in other forms than the prism shape.

In the described embodiment, the fitting structure for the modular connector which is integral with the sun visor has been described. However, the invention can be applied to the fitting structure for the modular connector for supporting other vehicle interior equipment such as room lamps, and so on.

What is claimed is:

1. A modular connector for attaching an interior equipment of a vehicle onto an interior wall member covering an inner face of a vehicle body panel and for supplying electric power to the interior equipment, comprising:

a connector member attached onto the interior wall member, and provided with a through hole and a first electric wire for supplying the electric-power to the interior equipment;

a bracket member provided with the interior equipment and a tube-shaped body through which a second electric wire is led out from the interior equipment, the tube-shaped body being inserted into the through hole to engaged with the connector member to electrically connect the first and second electric wires;

a wire holder protruded from an outer peripheral face of the tube-shaped body and extending in an axial direction of the tube-shaped body, for holding the second electric wire;

a first engagement member arranged in a portion defined as a spatial region surrounded by the wire holder, the outer peripheral face of the tube-shaped body, and a tangent line connecting a ridge portion of the wire holder and the outer peripheral face of the tube-shaped body; and a second engagement member provided in a circumferential portion of the through hole of the connector member, for being engaged with the first engaging member to retain the bracket member onto the connector member.

2. The modular connector as set forth in claim 1, wherein a slit from which the second electric wire is inserted is formed in the ridge portion of the wire holder.

* * * * *